United States Patent
Garnett et al.

[19]

[11] Patent Number: 6,010,422

[45] Date of Patent: Jan. 4, 2000

[54] ELECTRO-MECHANICAL TRANSMISSION

[75] Inventors: Stephen C. Garnett, Princeville; Eric D. Stemler, Peoria, both of Ill.; Alan R. Coutant, Caterpillar, United Kingdom

[73] Assignee: Caterpillar Inc., Peoria, Ill.

[21] Appl. No.: 09/207,948

[22] Filed: Dec. 9, 1998

Related U.S. Application Data

[60] Provisional application No. 60/069,384, Dec. 12, 1997.

[51] Int. Cl.[7] .................................................. F16H 3/72
[52] U.S. Cl. .............................. 475/5; 475/151; 475/296; 475/330
[58] Field of Search ................................. 475/5, 151, 296, 475/330, 218, 219

[56] References Cited

U.S. PATENT DOCUMENTS

| | | | |
|---|---|---|---|
| 5,080,637 | 1/1992 | Tenberge et al. | 475/330 X |
| 5,277,670 | 1/1994 | Tenberge | 475/296 X |
| 5,730,676 | 3/1998 | Schmidt | 475/5 |

*Primary Examiner*—Sherry L. Estremsky
*Attorney, Agent, or Firm*—Calvin E. Glastetter

[57] ABSTRACT

An electro-mechanical transmission includes an electrical section and a mechanical transmission to provide an infinitely adjustable power flow through the transmission. The mechanical transmission includes a planetary gearing mechanism having four planetary gear sets and six members which interact with the electrical section and a gear change mechanism to infinitely adjust output speed.

18 Claims, 9 Drawing Sheets

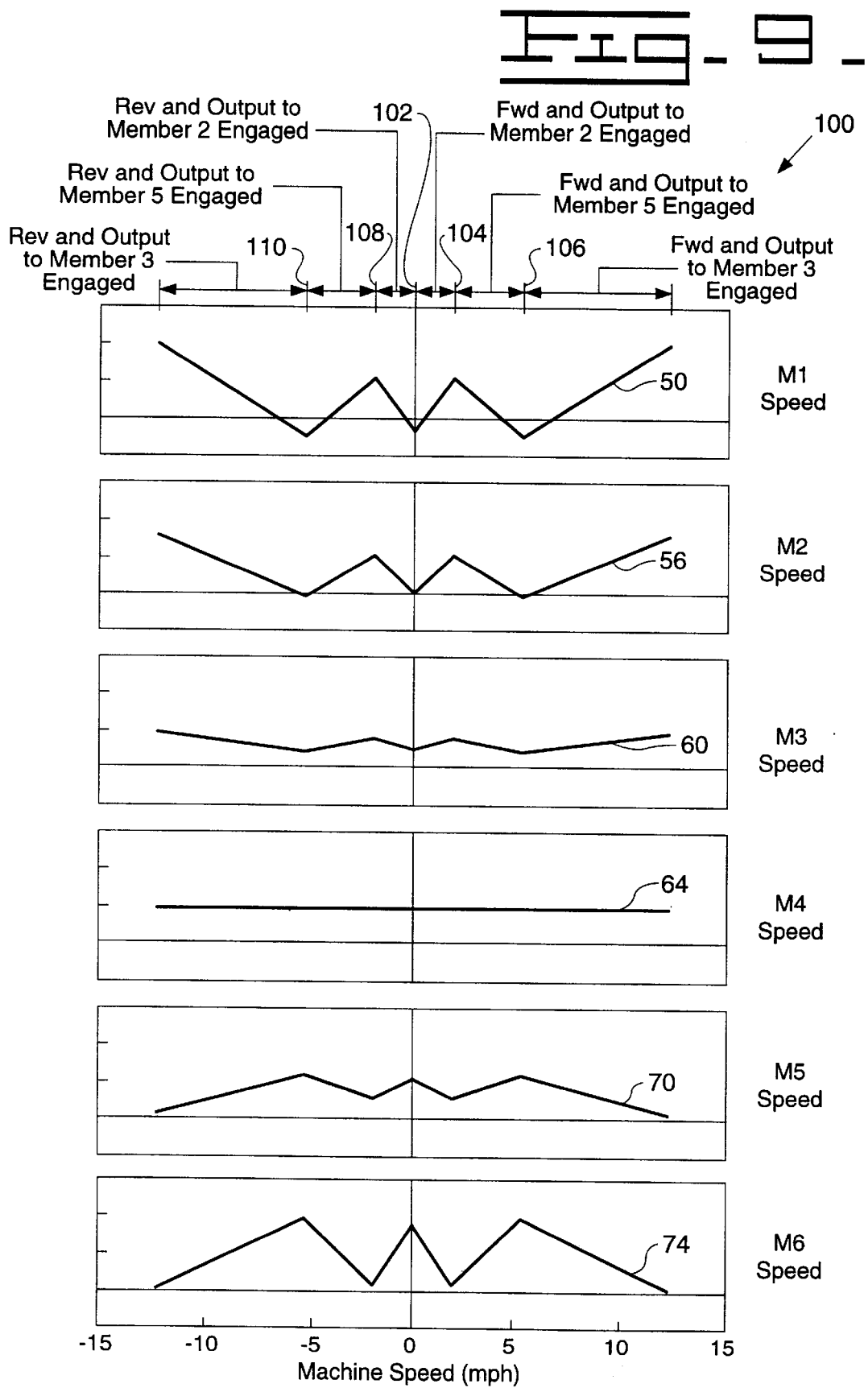

6,010,422

ELECTRO-MECHANICAL TRANSMISSION

This application claims the benefit of prior provisional patent application Ser. No. 60/069,384 filed Dec. 12, 1997.

TECHNICAL FIELD

This invention relates generally to an electro-mechanical transmission and more particularly to a planetary gearing having six members and four planetary gear sets.

BACKGROUND ART

In a machine, such as a wheel loader or a track type tractor, for example, an engine supplies power for propelling the machine in the forward or reverse directions as well as supply power for machine implements. A transmission is coupled to the engine and transmits power from the engine to the drive train to propel the machine. It is desirable to utilize a continuously variable transmission and manage the transmission ratio to hereby save engine power for the implements and also to provide a continuously variable power flow through the transmission to improve machine productivity. Because machines operate at relatively low speeds and in cyclical work routines, there is a need to control speed precisely and to be infinitely adjustable throughout the full range of the transmission. One of the problems associated with such an arrangement is to provide an electro-mechanical transmission that will operate at high efficiencies over a wide variety of operating conditions.

The present invention is directed to overcoming one or more of the problems as set forth above.

DISCLOSURE OF THE INVENTION

In one aspect of the present invention a electro-mechanical transmission having a input and a output is provided. The electro-mechanical transmission includes a first and a second motor/generator and a planetary gearing mechanism A first member of the planetary gearing mechanism is connected to one of the motor/generator. A second member of the planetary gearing mechanism is selectively connected to the output. A third member of the planetary gearing mechanism is selectively connected to the output. A fourth member of the planetary gearing mechanism is connected to the input. A fifth member of the planetary gearing mechanism is selectively connected to the output. A sixth member of the planetary gearing mechanism is connected to the other of the motor/generator. A gear change mechanism selectively connects the planetary gearing mechanism to the output for achieving various gear ratios.

BRIEF DESCRIPTION OF THE DRAWINGS

FIG. 9 is a schematic representation of a graph showing changes in the various components relative to machine speed.

BEST MODE FOR CARRYING OUT THE INVENTION

Figure 1:
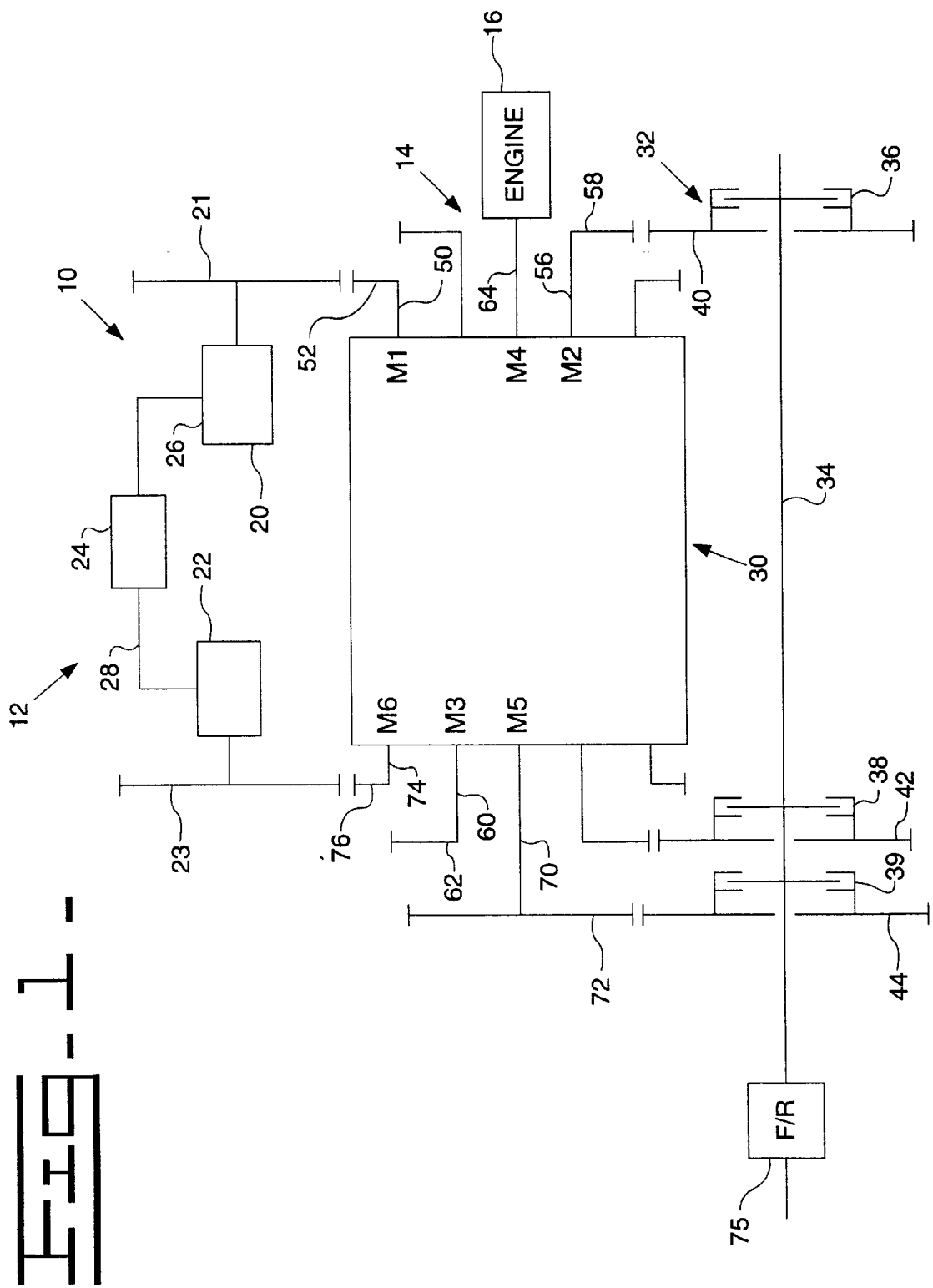
FIG. 1 is a schematic view of a transmission showing the present invention of six members of the planetary arrangement.

Referring to FIG. 1, a electro-mechanical transmission 10 includes a electric section 12 and a mechanical transmission 14 which interact to propel a machine, not shown. The electro-mechanical transmission provides the structure to distribute input power from a source of power, such as an engine 16, to an output. The electric section 12 includes a first motor/generator 20 having a gear 21 connected to the mechanical transmission 14, a second motor/generator 22 having a gear 23 connected to the mechanical transmission 14, and a controller 24 electrically connected to the motors/generators 20,22 by electrical cables 26,28. The controller 24 controls the speed and direction of the motors/generators 20,22 and also controls when to change between motor or generator.

The mechanical transmission 14 includes a planetary gearing mechanism 30 and a gear change mechanism 32 having an output shaft 34. The gear change mechanism controls the ratio of the transmission by engaging a first clutch 36, a second clutch 38 or a third clutch 39 for selectively connecting a respective gear 40,42,44 to the output shaft 34. A first member 50 of the planetary gearing mechanism 30 includes a gear 52 which is drivingly connected to the gear 21 of the motor/generator 20. A second member 56 of the planetary gearing mechanism 30 includes a gear 58 drivingly connected to the gear 40 of the gear change mechanism 32. A third member 60 of the planetary gearing mechanism 30 includes a gear 62 drivingly connected to the gear 42 of the gear change mechanism 32. A fourth member 64 of the planetary gearing mechanism 30 is drivingly connected to the engine 16. A fifth member 70 of the planetary gearing mechanism 30 includes a gear 72 drivingly connected to the gear 44 of the gear change mechanism 32. A sixth member 74 of the planetary gearing mechanism 30 includes a gear 76 drivingly connected to the gear 23 of the second motor/generator 22. The output shaft 34 of the gear change mechanism 32 can be connected to a conventional directional mechanism 75 to allow the machine to move in a forward or reverse direction. The members 50,56,60,64,70,74 can each comprise one or more elements of the planetary gearing mechanism 30 and any associated gears which are connected together to function as one member.

Reference numerals of components previously described will be repeated in subsequent drawing figures.

Figure 2:
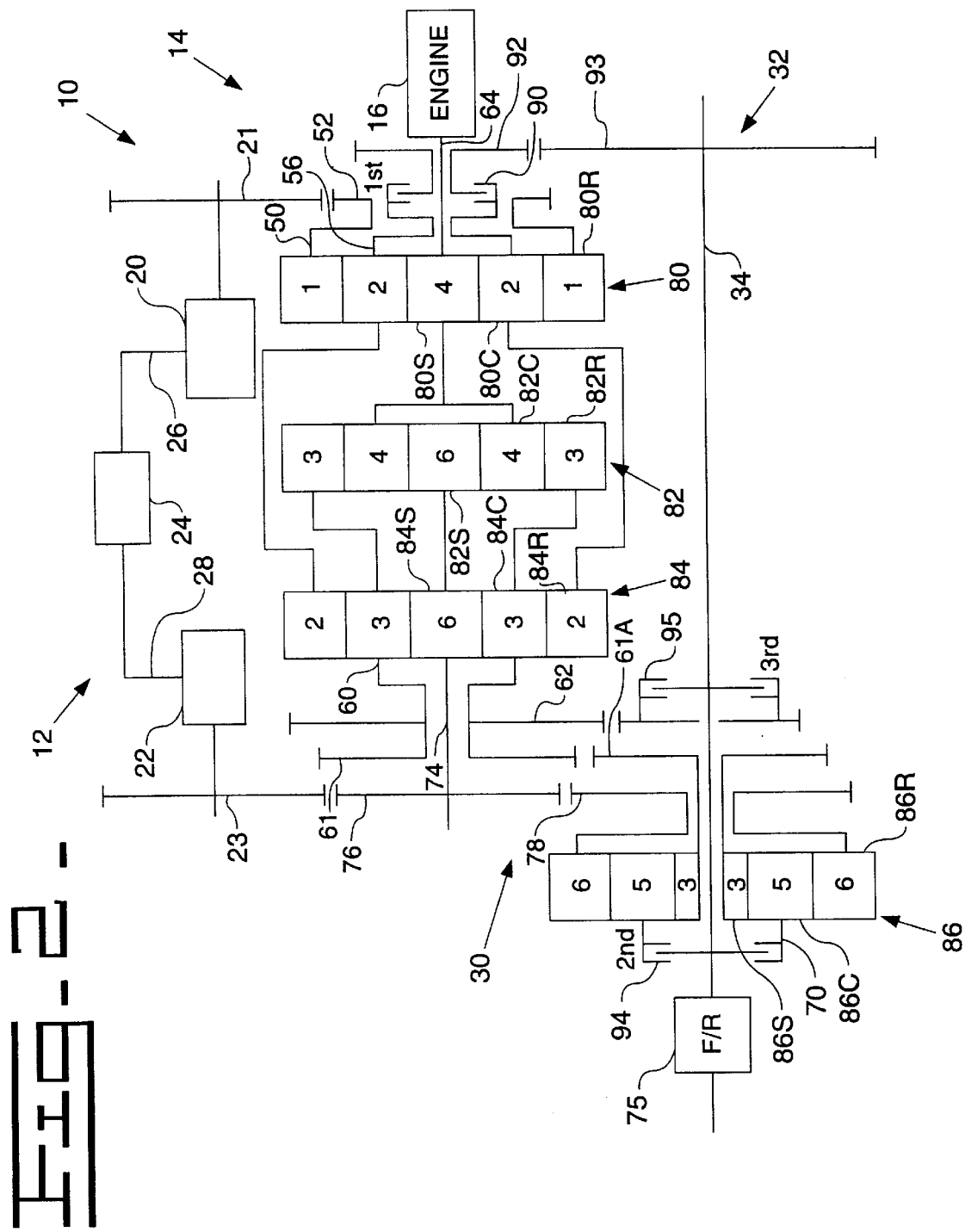
FIG. 2 is a schematic view of a transmission showing the present invention of six members of the planetary arrangement.

Referring to FIG. 2 the planetary gearing mechanism 30 includes a first planetary gear set 80, a second planetary gear set 82, a third planetary gear set 84 and a fourth planetary gear set 86. Each planetary gear set 80,82,84,86 includes elements such as a sun gear, a carrier having planet gears, a ring gear. The first planetary gear set 80 includes a sun gear 80S, a carrier 80C and a ring gear 80R. The second planetary gear set 82 includes a sun gear 82S, a carrier 82C and a ring gear 82R. The third planetary gear set 84 includes a sun gear 84S, a carrier 84C and a ring gear 84R. The fourth planetary gear set 86 includes a sun gear 86S, a carrier 86C and a ring gear 86R.

The first member 50 is connected to the ring gear 80R of the first planetary gear set 80 for rotation as a unit. The first member 50 includes the gear 52 meshed with the gear 21 of the first motor/generator 20. The second member 56 is connected to the carrier 80C of the first planetary gear set 80 and the ring gear 84R of the third planetary gear set 84 for rotation as a unit. The second member 56 is selectively connectable to the output shaft 34. The third member 60 is connected to the ring gear 82R of the second planetary gear set 82, the carrier 84C of the third planetary gear set 84 and the sun gear 86S of the fourth planetary gear set 86 for rotation as a unit. The third member 60 includes a first gear 61 and a second gear 61A meshed together and positioned between the third planetary set 84 and the fourth planetary gear set 86. The third member 60 also includes a third gear 62 selectively connectable to the output shaft 34. A fourth member 64 is connected to the sun gear 80S of the first planetary gear set 80 and the carrier 82C of the second planetary gear set 82 for rotation as a unit. The fourth member 64 is also connected to the engine 16 to provide the input. The fifth member 70 is connected to the carrier 86C of the fourth planetary gear set 86 for rotation as a unit and is selectively connectable to the output shaft 34. The sixth member 74 is connected to the sun gear 84S of the third planetary gear set 84, the sun gear 82S of the second planetary gear set 82 and the ring gear 86R of the fourth planetary gear set 86 for rotation as a unit. The sixth member 74 includes a first gear 76 and a second gear 78 meshed together and positioned between the third and fourth planetary gear sets 84,86. The first gear 76 also meshes with the gear 23 of the second motor/generator 22.

The gear change mechanism 32 includes a first clutch 90 engageable for selectively connecting the second member 64 to the output shaft 34 through a first a gear 92 and a second gear 93 for achieving a first gear ratio. A second clutch 94 is engageable for selectively connecting the fifth member 70 to the output shaft 34 for achieving a second gear ratio. A third clutch 95 is engageable for selecting connecting the third gear 62 of the third member 60 to the output shaft 34 for achieving a third gear ratio. Although clutches are shown in the drawing it is recognized that means, such as shift collars, could be used to change gear ratios without departing from the scoope of the invention.

The directional mechanism 75 is connected to the output shaft 34 and is actuated, in a know manner, to propel the machine in a forward or reverse direction.

Figure 3:
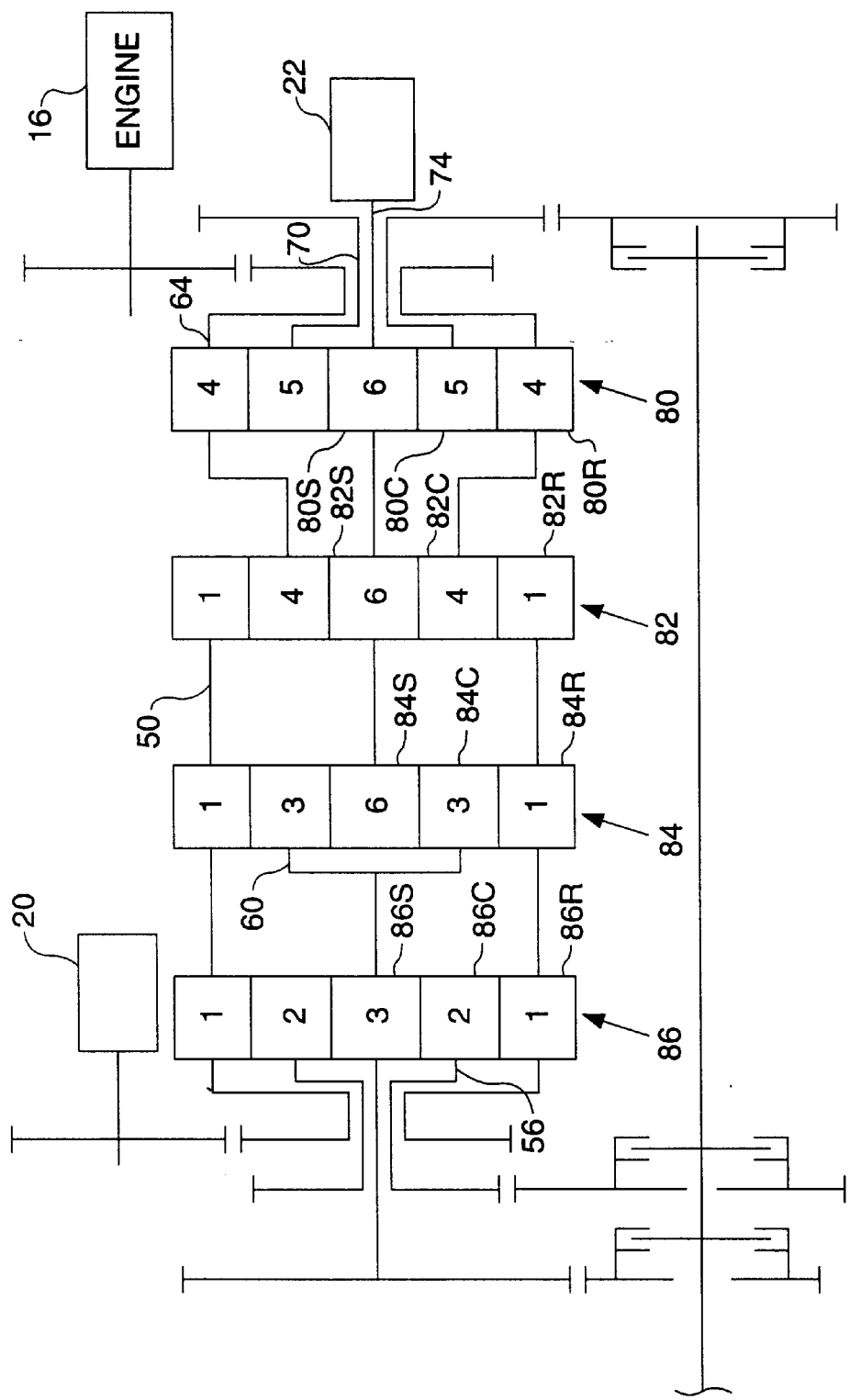
FIG. 3 is a schematic view of an alternate transmission arrangement.

Referring to FIG. 3, the first member 50 includes the ring gear 82R of the second planetary gear set 82, the ring gear 84R of the third planetary gear set 84, the ring gear 86R of the fourth planetary gear set 86 and is connected to the first motor/generator 20. the second member 56 includes the carrier 86C of the fourth planetary gear set 86 and is selectively connectable to the output shaft 34. The third member 60 includes the carrier 84C of the third planetary gear set 84, the sun gear 86S of the fourth planetary gear set 86 and is selectively connectable to the output shaft 34. The fourth member 64 includes the ring gear 80R of the first planetary gear set 80, the carrier 82C of the second planetary gear set 82 and is connected to the engine 16. The fifth member 70 includes the carrier 84C of the first planetary gear set 84 and is selectively connectable to the output shaft 34. The sixth member 74 includes the sun gear 80S of the first planetary gear set 80, the sun gear 82S of the second planetary gear set 82, the sun gear 84S of the third planetary gear set 84 and is connected to the second motor/generator 22.

Figure 4:
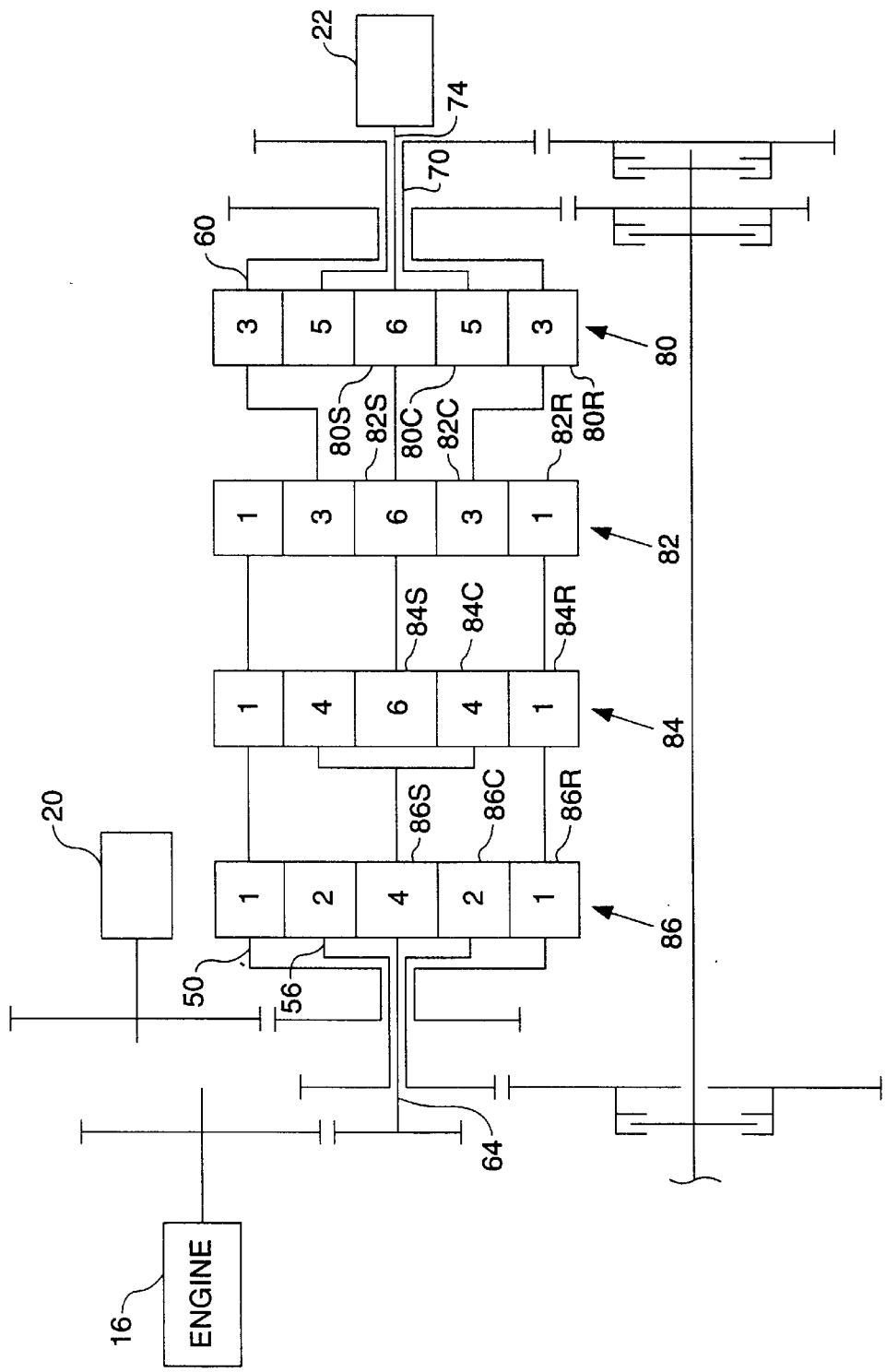
FIG. 4 is a schematic view of an alternate transmission arrangement.

Referring to FIG. 4, the first member 50 includes the ring gear 82R of the second planetary gear set 82, the ring gear 84R of the third planetary gear set 84, the ring gear 86R of the fourth planetary gear set and is connected to the first motor/generator 20. The second member 56 includes the carrier 86C of the fourth planetary gear set 86 and is selectively connectable to the output shaft 34. The third member 60 includes the ring gear 80R of the first planetary gear set 80, the carrier 82C of the second planetary gear set 80 and is selectively connectable to the output shaft 34. The fourth member 64 includes the carrier 84C of the third planetary gear set 84, the sun gear 86S of the fourth planetary gear set 86 and is connected to the engine 16. The fifth member 70 includes carrier 80C of the first planetary gear set 80 and is selectively connectable to the output shaft 34. The sixth member 74 includes sun gear 80S of the first planetary gear set 80, the sun gear 82S of the second planetary gear set 82, the sun gear 84S of the third planetary gear set 84 and is connected to the second motor/generator 22.

Figure 5:
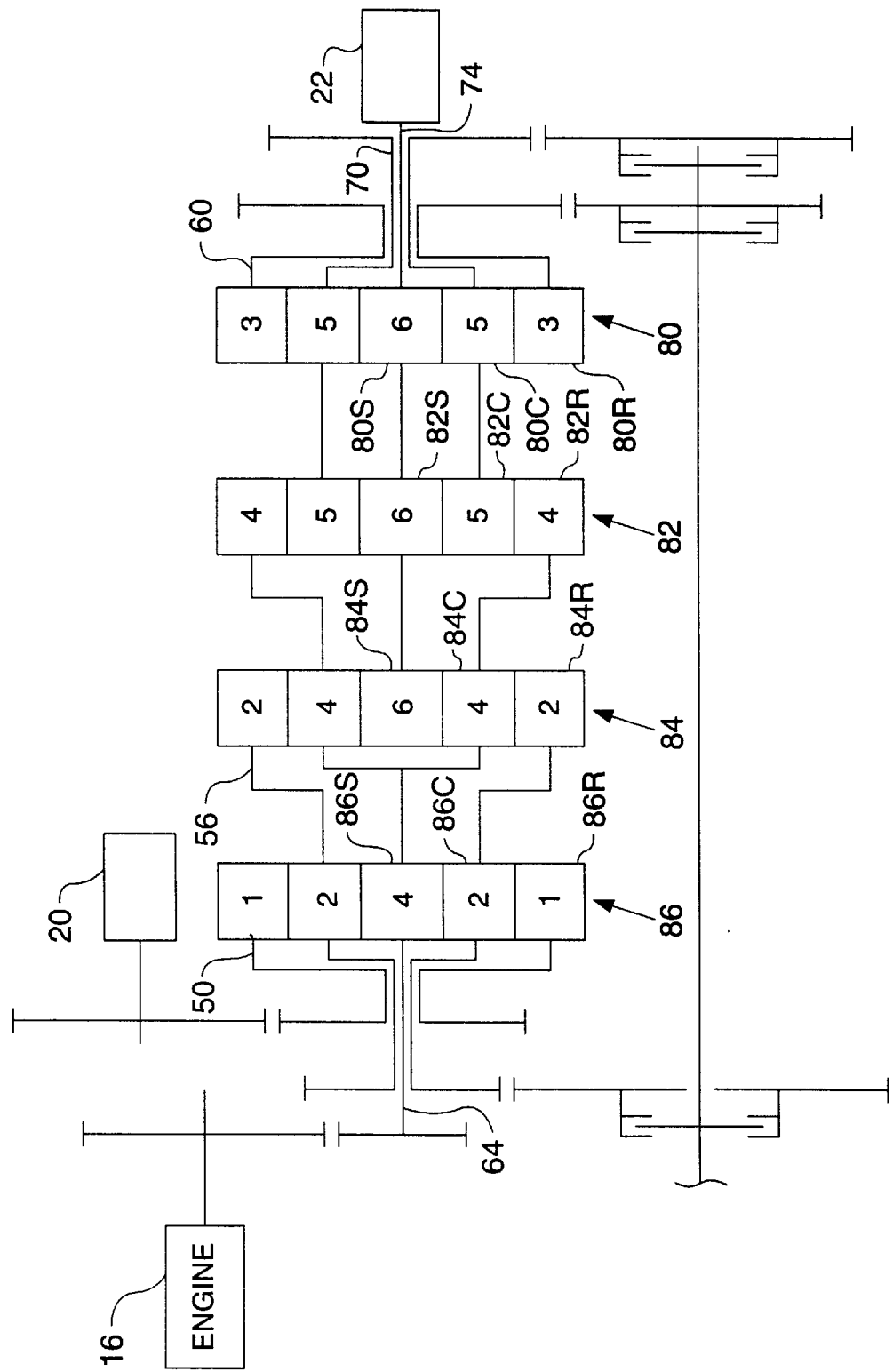
FIG. 5 is a schematic view of an alternate transmission arrangement.

Referring to FIG. 5, the first member 50 includes the ring gear 86R of the fourth planetary gear set 86 and is connected to the first motor/generator 20. The second member 56 includes the ring gear 84R of the third planetary gear set 84, the carrier 86C of the fourth planetary 86 and is selectively connectable to the output shaft 34. The third member 60 includes the ring gear 80R of the first planetary gear set 80 and is selectively connectable to the output shaft 34. The fourth member 64 includes the ring gear 82R of the second planetary gear set 82, the carrier 84C of the third planetary gear set 84, the sun gear 86S of the fourth planetary gear set 86 and is connected to the engine 16. The fifth member 70 includes the carrier 80C of the first planetary 80, the carrier 82C of the second planetary gear set 82 and is selectively connectable to the output shaft 34. The sixth member 74 includes the sun gear 80S of the first planetary gear set 80, the sun gear 82S of the second planetary gear set 82, the sun gear 84S of the third planetary gear set 84 and is connected to the second motor/generator 22.

Figure 6:
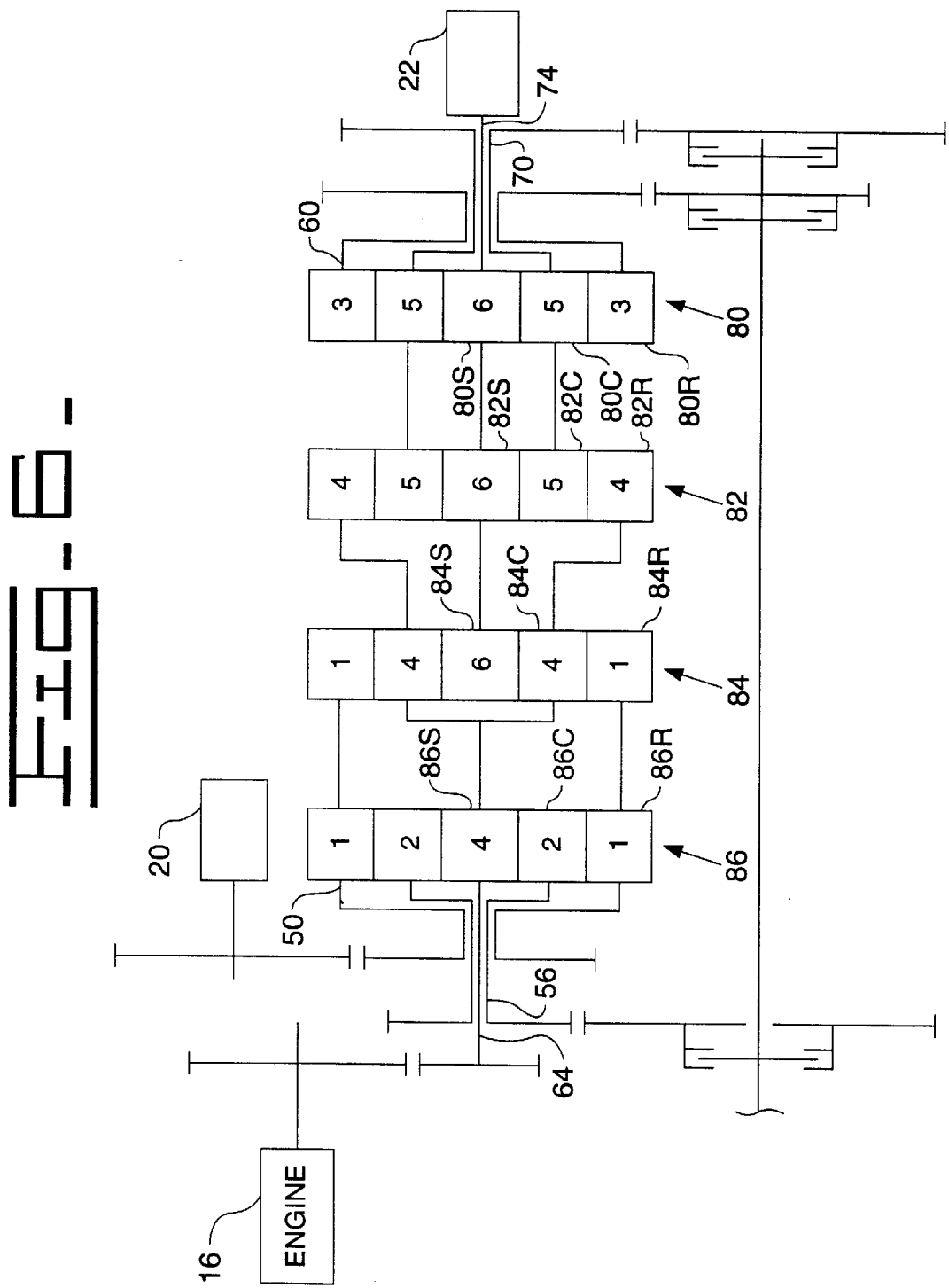
FIG. 6 is a schematic view of an alternate transmission arrangement.

Referring to FIG. 6, the first member 50 includes the ring gear 84R of the third planetary gear set 84, the ring gear 86R of the fourth planetary gear set 86 and is connected to the first motor/generator 20. The second member 56 includes the carrier 86C of the fourth planetary gear set 86 and is selectively connectable to the output shaft 34. The third member 60 includes the ring gear 80R of the first planetary gear set 80 and is selectively connectable to the output shaft 34. The fourth member 64 includes the ring gear 82R of the second planetary gear set 82, the carrier 84C of the third planetary gear set 84, the sun gear 86S of the fourth planetary gear set 86 and is connected to the engine 16. The fifth member 70 includes the carrier 80C of the first planetary gear set 80, the carrier 82C of the second planetary gear set 82 and is selectively connectable to the output shaft 34. The sixth member 74 is connected to the sun gear 80S of the first planetary gear set 80, the sun gear 82S of the second planetary gear set 82, the sun gear 84S of the third planetary gear set 84 and is connected to the second motor/generator 22.

Figure 7:
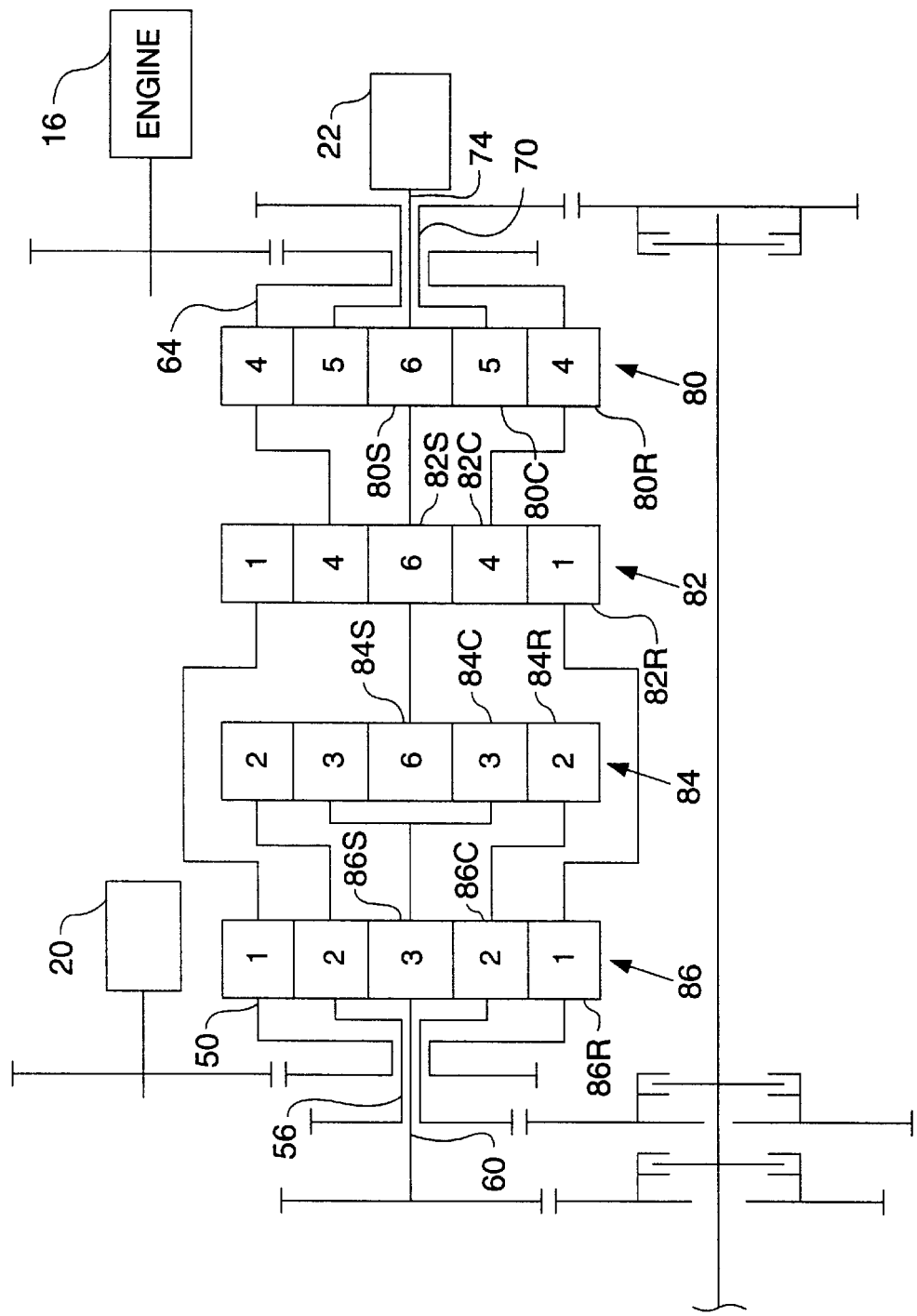
FIG. 7 is a schematic view of an alternate transmission arrangement.

Referring to FIG. 7, the first member 50 includes the ring gear 82R of the second planetary gear set 82, the ring gear 86R of the fourth planetary gear set 86 and is connected to the first motor/generator 20. The second member 56 includes the ring gear 84R of the third planetary gear set 84, the carrier 86C of the fourth planetary gear set 86 and is selectively connectable to the output shaft 34. The third member 60 includes the carrier 84C of the third planetary gear set 84, the sun gear 86S of the fourth planetary gear set 86 and is selectively connectable to the output shaft 34. The fourth member 64 includes the ring gear 80R of the first planetary gear set 80, the carrier 82C of the second planetary gear set 82 and is connected to the engine 16. The fifth member 70 includes the carrier 80C of the first planetary gear set 80 and is selectively connectable to the output shaft 34. The sixth member 74 includes the sun gear 80S of the first planetary gear set 80, the sun gear 82S of the second planetary gear set 82, the sun gear 84S of the third planetary gear set 84 and is connected to the second motor/generator 22.

Figure 8:
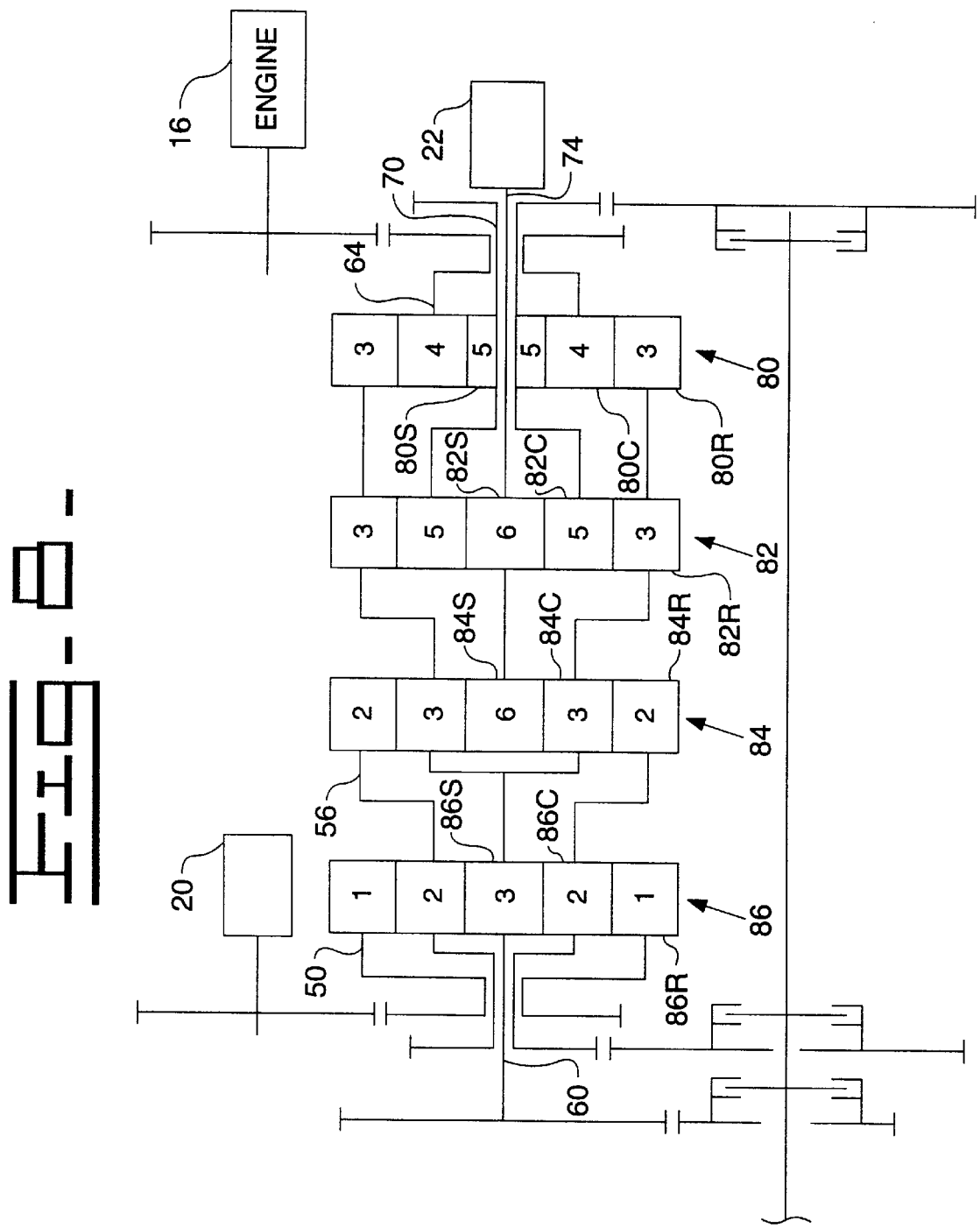
FIG. 8 is a schematic view of an alternate transmission arrangement.

Referring to FIG. 8, the first member includes the ring gear 86R of the fourth planetary gear set 86 and is connected to the first motor/generator 20. The second member 56 includes the ring gear 84R of the third planetary gear set 84, the carrier 86C of the fourth planetary gear set 86 and is selectively connectable to the output shaft 34. The third member 60 includes the ring gears 80R,82R of the first and second planetary gear sets 80,82, the carrier 84C of the third planetary gear set 84, the sun gear 86S of the fourth planetary gear set 86 and is selectively connectable to the output shaft 34. The fourth member 64 includes the carrier 80C of the first planetary gear set 80 and is connected to the engine 16. The fifth member 70 includes the sun gear 80S of the first planetary gear set 80, the carrier 82C of the second planetary gear set 82 and is selectively connectable to the output shaft 34. The sixth member 74 includes the sun gears 82S,84S of the second and third planetary gear set 82,84 and is connected to the second motor/generator 22.

Referring to FIG. 9, a graph 100 discloses the changes in the members and associated components as the machine speed from zero speed until maximum speed is achieved in both forward and reverse directions. The graph 100 shows the changes to the various members as shown in FIG. 2. Line 102 represents zero speed at which the clutch 80 is engaged, the clutches 86,88 are disengaged and the engine 16 and the motors/generators 20,22 maintain the machine at zero speed. From line 102 until line 104 the clutch 80 is engaged, the directional mechanism 90 is in the forward direction and the machine increases in speed. At line 104 the clutch 80 is disengaged and the clutch 86 is engaged to shift from the first gear ratio to the second gear ratio. At line 106 the clutch 86 disengaged and the clutch 88 is engaged is engaged to shift from the second gear ratio to the third gear ratio. In the reverse direction the gear ratios will change at line 108 and 110. A plurality of data lines 50,56,60,64,70,74 on the graph 100 correspond to reference numerals of the six members. The data lines represent the speed and direction of the various members as the machine speed increases.

INDUSTRIAL APPLICABILITY

In the use of the electro-mechanical transmission 10 of FIGS. 2 and 9, the electrical section 12 and the mechanical transmission 14 interact to provide a continuously variable and efficient output which enables the engine 16 to operate at its best efficiency.

In operation of the electro-mechanical transmission 10 with the engine 16 and the connected fourth member 64 operating at a constant predetermined speed level the clutch 90 is engaged and the clutches 94,95 disengaged the motors/generators 20,22 maintain the machine speed at zero. If the operator elects to move the machine in a forward direction, for example, from zero to approximately 2–3 mph, the clutch 90 remains engaged for first gear ratio, the directional mechanism 75 is in the forward direction, the first member 50 and the first motor/generator 20 increases in speed, the second member 54 increases in speed and is connected to the output shaft 34 by engagement of the clutch 90, the third member increases in speed, the fifth member 72 decreases in speed and the sixth member 74 and the second motor/generator 22 decreases in speed.

At line 104, which is approximately 2–3 mph, the clutch 90 is disengaged to disconnect the second member 54 from the output and clutch 94 is engaged, to achieve the second gear ratio, to connect the fifth member 72 to the output. The first member 50 and the first motor/generator 20 decrease in speed, the second member 54 decreases in speed, the third member 56 decreases in speed, the fifth member 72 increases in speed, the sixth member and the second motor/generator 22 increase in speed.

At line 106, which is approximately 5 mph, the clutch 90 is disengaged to disconnect the fifth member 72 from the output and the clutch 95 is engaged, to achieve third gear ratio, to connect the third member 56 to the output. The first member 50 and the first motor/generator 20 increase in speed, the second member 54 increases in speed, the third member 56 increases in speed, the fifth member 72 decreases in speed, the sixth member 74 and the second motor/generator 22 decreases in speed. The members 50,54, 56 will increase in speed and the members 72,74 will decrease in speed until the machine has reached its maximum speed.

It is recognized that the above description relates to a three speed ratio electro-mechanical transmission, however more clutches or shift collars could be used to achieve higher gear ratios without departing from the scope of the invention. The speed of the machine can be increased from zero speed to some predetermined maximum speed level at a smooth continuous manner. This is accomplished by the interaction of the motor/generators and the mechanical transmission by engaging and disengaging clutched or shift collars.

In the subject arrangement the machine can be operated in reverse through the same gear ratios as set forth above with respect to operating in the forward direction. To operate in reverse the directional mechanism must be changed to the reverse direction.

In view of the forgoing, it is readily apparent that the electro-mechanical transmission of the present invention having six members and four planetary gear sets that will provide a continuously variable transmission.

Other aspects, objects and advantages of this invention can be obtained from a study of the drawings, the disclosure and the appended claims.

We claim:

1. An electro-mechanical transmission having an input and an output, the electro-mechanical transmission comprising:

a first motor/generator;

a second motor/generator;

a planetary gearing mechanism;

a first member of the planetary gearing mechanism being connected to one of the motor/generators;

a second member of the planetary gearing mechanism being selectively connected to the output;

a third member of the planetary gearing mechanism being selectively connected to the output;

a fourth member of the planetary gearing mechanism being connected to the input;

a fifth member of the planetary gearing mechanism being selectively connected to the output;

a sixth member of the planetary gearing mechanism being connected to the other of the motor/generator; and a gear change mechanism selectively connects the planetary gearing mechanism to the output for achieving various gear ratios.

2. The electro-mechanical transmission of claim 1 wherein the planetary gearing mechanism includes a first planetary gear set, a second planetary gear set, a third planetary gear set and a fourth planetary gear set, each of the planetary gear sets include a sun gear, a carrier with planet gears and a ring gear.

3. The electro-mechanical transmission of claim 2 wherein the first member includes the ring gear of the first planetary gear set.

4. The electro-mechanical transmission of claim 2 wherein the second member includes the carrier of the first planetary gear set and the ring gear of the third planetary gear set.

5. The electro-mechanical transmission of claim 2 wherein the third member includes the ring gear of the second planetary gear set, the carrier of the third planetary gear set and the sun gear of the fourth planetary gear set.

6. The electro-mechanical transmission of claim 2 wherein the fourth member includes the sun gear of the first planetary gear set and the carrier of the second planetary gear set.

7. The electro-mechanical transmission of claim 2 wherein the fifth member includes the carrier of the fourth planetary gear set.

8. The electro-mechanical transmission of claim 2 wherein the sixth member includes the sun gears of the second and third planetary gear sets and the ring gear of the fourth planetary gear set.

9. The electro-mechanical transmission of claim 2 wherein the first member includes the ring gear of the second planetary gear set, the ring gear of the third planetary gear set and the ring gear of the fourth planetary gear set, the second member includes the carrier of the fourth planetary gear set, the third member includes the carrier of the third planetary gear set and the sun gear of the fourth planetary gear set, the fourth member includes the ring gear of the first planetary gear set and the carrier of the second planetary gear set, the fifth member includes the carrier of the first planetary gear set, the sixth member includes the sun gears of the first, second and third planetary gear sets.

10. The electro-mechanical transmission of claim 2 wherein the first member includes the ring gear of the second planetary gear set, the ring gear of the third planetary gear set, and the ring gear of the fourth planetary gear set, the second member includes the carrier of the fourth planetary gear set, the third member includes the ring gear of the first planetary gear set and the carrier of the second planetary gear set, the fourth member includes the carrier of the third planetary gear set and the sun gear of the fourth planetary gear set, the fifth member includes carrier of the first planetary gear set, the sixth member includes sun gears of the first, second and third planetary gear sets.

11. The electro-mechanical transmission of claim 2 wherein the first member includes the ring gear of the fourth planetary gear set, the second member includes the ring gear of the third planetary gear set and the carrier of the fourth planetary, the third member includes the ring gear of the first planetary gear set, the fourth member includes the ring gear of the second planetary gear set, the carrier of the third planetary gear set and the sun gear of the fourth planetary gear set, the fifth member includes the carriers of the first and second planetary gear sets, the sixth member includes the sun gears of the first, second and third planetary gear sets.

12. The electro-mechanical transmission of claim 2 wherein the first member includes the ring gears of the third and fourth planetary gear set, the second member includes the carrier of the fourth planetary gear set, the third member includes the ring gear of the first planetary gear set, the fourth member includes the ring gear of the second planetary gear set, the carrier of the third planetary gear set and the sun gear of the fourth planetary gear set, the fifth member includes the carriers of the first and second planetary gear sets, the sixth member includes the sun gears of the first, second and third planetary gear sets.

13. The electro-mechanical transmission of claim 2 wherein the first member includes the ring gears of the second and fourth planetary gear sets, the second member includes the ring gear of the third planetary gear set and the carrier of the fourth planetary gear set, the third member includes the carrier of the third planetary gear set and the sun gear of the fourth planetary gear set, the fourth member includes the ring gear of the first planetary gear set and the carrier of the second planetary gear set, the fifth member includes the carrier of the first planetary gear set, the sixth member includes the sun gears of the first, second, and third planetary gear sets.

14. The electro-mechanical transmission of claim 2 wherein the first member includes the ring gear of the fourth planetary gear set, the second member includes the ring gear of the third planetary gear set and the carrier of the fourth planetary gear set, the third member includes the ring gears of the first and second planetary gear sets, the carrier of the third planetary gear set and the sun gear of the fourth planetary gear set, the fourth member includes the carrier of the first planetary gear set, the fifth member includes the sun gear of the first planetary gear set and the carrier of the second planetary gear set, the sixth member includes the sun gears of the second and third planetary gear sets.

15. The electro-mechanical transmission of claim 2 including the gear change mechanism selectively connecting one of the second member, the third member and the fifth member to the output.

16. The electro-mechanical transmission of claim 15 wherein the gear change mechanism includes a first clutch engageable to selectively connect the second member to the output for achieving a first gear ratio.

17. The electro-mechanical transmission of claim 15 wherein the gear change mechanism includes a second clutch engageable to selectively connect the fifth member to the output for achieving a second gear ratio.

18. The electro-mechanical transmission of claim 15 wherein the gear change mechanism includes a clutch engageable to selectively connect the third member to the output for achieving a third gear ratio.

* * * * *